Dec. 14, 1954
W. O. BAKER ET AL
2,697,136
MICROPHONE AND MICROPHONE GRANULES
Filed April 28, 1951
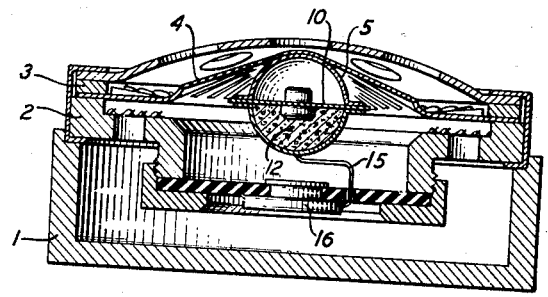
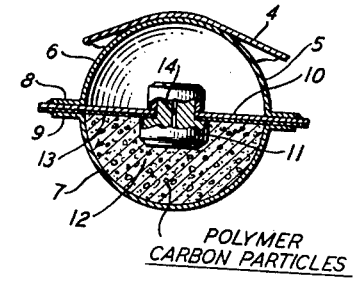
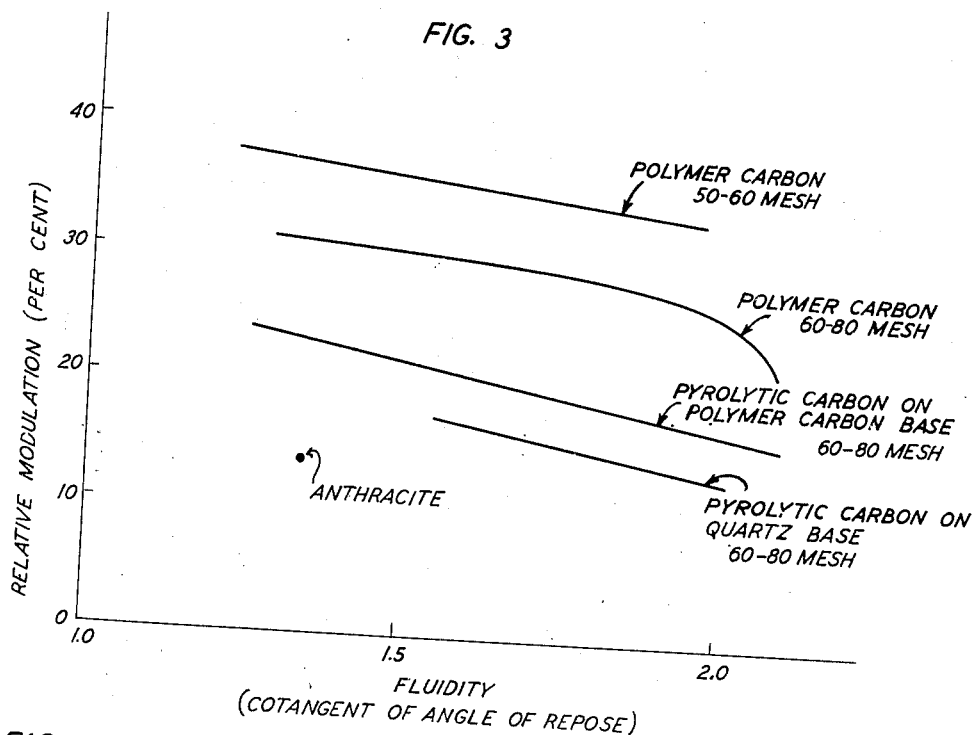
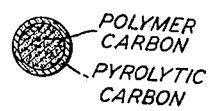
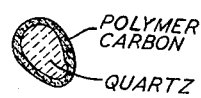
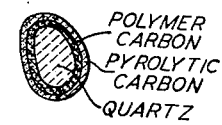
INVENTORS *W. O. BAKER*
*R. O. GRISDALE*
*Edwin B. Cave*
ATTORNEY

United States Patent Office 2,697,136
Patented Dec. 14, 1954

2,697,136

MICROPHONE AND MICROPHONE GRANULES

William O. Baker, Morristown, and Richard O. Grisdale, Short Hills, N. J., assignors to Bell Telephone Laboratories, Incorporated, New York, N. Y., a corporation of New York Application April 28, 1951, Serial No. 223,635

14 Claims. (Cl. 179—122)

This invention relates to microphones and similar devices in which changes in mechanical pressure on a granular mass are converted into changes in the electrical resistance of the mass.

For many years the conventional material used in devices of this type has been a granular carbon formed by heat treating particles of anthracite. In order to avoid the inherent difficulties of working with a natural material such as anthracite, various other materials have been suggested as microphone granules, such as rounded particles of a ceramic or puffed silica gel having on their surfaces a carbon coating pyrolytically deposited from a hydrocarbon gas (United States Patent 1,973,703 to F. S. Goucher and C. J. Christensen and United States Patent 2,151,083 to C. J. Christensen, F. S. Goucher and H. G. Wehe). However, none of these materials has to the present time achieved any substantial commercial use as compared with anthracite.

The devices of the present invention embody a granular material possessing one or more of several advantages over the microphone materials hitherto used or proposed. The advantages will be discussed in detail below. The material of which the granules of the present invention are composed, wholly or in part, is a form of carbon, or modified carbon, to which the name polymer carbon has been given. This carbon is formed by the pyrolysis in situ of shaped bodies of high molecular weight, highly cross-linked, solid polymeric hydrocarbons or modified hydrocarbons. This pyrolysis results in the formation of unitary, coherent, continuous bodies of carbon having the same shape as the polymer bodies from which they are formed and having a hard, lustrous, microscopically smooth surface.

One of the most important and basic characteristics of a microphone granule material is its modulation efficiency or its ability to translate pressure change into change of electrical resistance. Another important characteristic is its overall density which should be of the optimum value for its efficient use in the particular microphone design which is employed. Further desirable characteristics are the ability to be formed into particles of uniform size and shape and possession of a value of electrical resistance adapted to the particular requirements of the circuit in which the microphone is to be used.

These desirable characteristics are all exhibited by microphone granules consisting of spheres or agglomerated spheres of polymer carbon. The exceptional smoothness of polymer carbon surfaces gives them an intrinsic modulation efficiency superior to any other form of carbon hitherto known. The apparent density of the polymer carbon particles (as determined by measuring the volume of the particles by the displacement of a liquid which does not wet the pores, such as alcohol, xylene or mercury) can be controlled to any desired value between about 1 gram per cubic centimeter and 1.6 grams per cubic centimeter by selection of the proper polymer for pyrolysis and by treatment of the polymer spheres prior to pyrolysis as will be discussed below. The bulk density of a mass of the particles (which is the weight per unit overall volume of the mass including the air spaces) can be varied between about 0.6 gram per cubic centimeter and 1.0 or even 1.2 grams per cubic centimeter by varying the factors referred to above as well as the particle size and particle size distribution in the mass. This controllable density, together with the controllable fluidity and controllable resistivity to be described below, considerably widen design potentialities for microphones in which polymer carbon particles are used. The polymer carbon particles can be readily formed in perfect spherical shape in any desired size as will be discussed in more detail below. The resistance of the polymer carbon can be varied over a wide range without a substantial effect upon the modulation.

The desirable modulation efficiency of polymer carbon surfaces can be utilized in microphone granules of other structure as, for instance, in granules formed of rounded particles of refractory non-conductive materials such as fused quartz or puffed silica gel coated with a layer of polymer carbon.

As mentioned above, the controllable density and fluidity of polymer carbon particles widen the design potentialities of microphones in which they are used even if the full benefit of their superior modulation is not utilized. Thus polymer carbon granules are of substantial value as bases for the deposition of a layer of carbon pyrolytically deposited from a hydrocarbon gas. Although the modulation efficiency of their surfaces is not as high as that of uncoated polymer carbon, it is nevertheless substantially superior to the modulation efficiency of a single layer of pyrolytic carbon of good microphonic properties deposited directly on quartz or any of the other materials hitherto suggested for forming microphone granules.

This good modulation efficiency of pyrolytic carbon deposited on polymer carbon surfaces can be utilized advantageously with any type of granule base. Thus, particles of quartz, silica gel or any other refractory material, when coated first with polymer carbon and then with pyrolytic carbon, give a modulation efficiency substantially better than similar particles in which a single layer of pyrolytic carbon of good microphonic properties is deposited directly on the base without the intermediate layer of polymer carbon.

The present invention includes all of the microphone granule structures set forth above. The manner in which these granules can be utilized in a microphonic device is illustrated in the accompanying drawing in which:

Fig. 1 is a front elevation in section of a microphone utilizing the granules of the present invention;

Fig. 2 is an enlarged view in section of a portion of the microphone shown in Fig. 1;

Fig. 3 is a chart showing the relative modulation efficiencies of various microphone materials and the variation of these efficiencies with variation in the fluidity of the materials;

Fig. 4 is a sectional view of a microphone granule consisting of a polymer carbon sphere;

Fig. 5 is a diagrammatic sectional view of a microphone granule consisting of a polymer carbon sphere coated on its surface with carbon pyrolytically deposited from a hydrocarbon gas;

Fig. 6 is a diagrammatic sectional view of a microphone granule consisting of a quartz base with a surface layer of polymer carbon; and Fig. 7 is a diagrammatic sectional view of a microphone granule consisting of a quartz base covered with a layer of polymer carbon and having an external layer of pyrolytic carbon.

Since the modulation efficiency and contact resistance of polymer carbon microphone granules are more stable upon aging when the granules are maintained in certain types of inert atmospheres than when in contact with air, as will be discussed in more detail below, a microphone having a sealed granule chamber such as shown in Figs. 1 and 2 is particularly desirable for use with granules of this type.

The microphone shown in Figs. 1 and 2 is made up of a case 1 which carries, by means of support members 2 and 3, a dished and corrugated diaphragm 4. At the center of the diaphragm 4, a spherical container 5 is mounted as by means of solder or adhesive.

The spherical container is made up of an upper metal hemisphere 6 and a lower metal hemisphere 7, each having a projecting lip 8, 9. Between the projecting lips is mounted an inertia diaphragm 10 formed of metal and carrying at its center an inertia and contact member 11, which is also formed of metal and which is in electrical contact with the diaphragm 10. The chamber defined by the lower hemisphere 7 and the diaphragm 10 is filled with a mass 12 of the granular microphone material of the present invention. The diaphragm 10 is electrically insulated from the microphonic material 12 and from the lower hemisphere 7 by means of an insulating coating 13 on its lower surface which may be formed of a thin layer of enamel, either organic or vitreous. An air passage 14 is formed in the contact member 11 to equalize the air pressure in the upper and lower chambers of the sphere when the diaphragm 10 vibrates.

The sphere 5 is preferably filled with a suitable inert gas, such as dry helium or nitrogen, to prolong the life of the polymer carbon microphonic material. When the sphere is filled with a special atmosphere, it is necessary that the two hemispheres 6 and 7 be sealed adequately where the lips 8, 9 meet the diaphragm 10 to prevent escape of the gas and entry of the air from the atmosphere. The metal surface of the lip 8 can be hermetically sealed to the upper metal surface of the diaphragm 10 by soldering, brazing or welding or by means of an adhesive, proper steps being taken to insure electrical contact between the diaphragm and the hemisphere.

The insulated lower surface of the diaphragm 10 may be sealed to the metal surface of the lip 9 by means of an adhesive or a glass-to-metal seal in such manner as to avoid electrical contact between the diaphragm and the lower hemisphere. The lower hemisphere 7, which is in electrical contact with the mass 12 of microphonic material, is electrically connected, by means of a wire 15 to a terminal 16.

In the operation of the microphone, sound waves impinging on the diaphragm 4 cause it to vibrate and with it the sphere 5. The inertia of the member 11 thereupon creates a relative motion between the diaphragm 10 and the sphere 5, causing a periodic change in the pressure of the diaphragm 10 upon the microphonic mass 12. The resulting change in the electrical resistance of the mass 12 is utilized by the passage of an electric current from the lower hemisphere through the mass 12, through the contact member 11, through the diaphragm 10 and finally through the upper hemisphere 5 and diaphragm 4 to the microphone case. The structure and operation of a microphone of this type are more particularly described and claimed in the copending application of H. Eckardt, Serial No. 97,972, filed June 9, 1949, now Patent No. 2,567,368.

The chart in Fig. 3 shows the relative modulation, under certain conditions of test, of microphone granules of the present invention and certain prior known materials. These tests were carried out in a test cell of essentially cylindrical shape with a vibratile diaphragm mounted as one end of the cylinder. The test cell was filled with a microphonic material and the diaphragm was vibrated at a frequency of 1 kilocycle per second and with an amplitude of several hundred angstroms. The modulation was measured as the ratio of the instantaneous change in resistance of the mass on vibration to the average agitated resistance of the mass.

It can be seen from the chart that anthracite microphone granules measured under these conditions gave a modulation of about 13 per cent. Polymer carbon particles having a particle size corresponding to 50 to 60 mesh (passing a No. 50 sieve having a sieve opening of 0.30 millimeter but not passing a No. 60 sieve having a sieve opening of 0.25 millimeter) gave a modulation varying between 33 per cent and 38 per cent, depending upon the fluidity of the mass of particles. Polymer carbon particles having a particle size of 60 to 80 mesh (passing a No. 60 sieve but not passing a No. 80 sieve having a sieve opening of 0.177 millimeter) gave a modulation of between 21 per cent and 31 per cent depending upon the fluidity. The anthracite particles tested also had a size of 60 to 80 mesh.

The fluidity of the mass of particles is given on the chart in terms of the cotangent of the angle of repose of the mass. The cotangent of the angle of repose of a mass consisting almost entirely of substantially perfect spheres of polymer carbon of 60 to 80 mesh was measured as about 2.15. The fluidity of the mass can be decreased by adding varying amounts of irregular particles formed by the agglomeration of spheres as will be discussed in more detail below. By the addition of large amounts of agglomerates, the fluidity was reduced to a value of about 1.3 which was the value measured for the anthracite particles. The agglomerates which were added had a particle size the same as that of the spheres to which they were added, indicating that they were agglomerates of spheres of a smaller size.

The chart shows that polymer carbon particles having a coating of carbon deposited pyrolytically from a hydrocarbon gas gave a modulation, at various values of fluidity, which was somewhat lower than that of uncoated polymer carbon of similar particle size but substantially higher than that of quartz base particles coated in the same manner with pyrolytic carbon. Values of modulation obtained for quartz particles coated first with polymer carbon and then with pyrolytic carbon (not shown on the chart) are substantially the same as those obtained for polymer carbon particles coated with pyrolytic carbon.

The pyrolytic carbon was deposited upon the particles referred to above by heating them in a furnace rotating at 24 revolutions per minute at a temperature of 1150° C. for two hours while passing nitrogen containing 30 per cent methane through the furnace according to the method described in United States Patent 1,973,703 referred to above.

The chart in Fig. 3 shows that, for the microphonic materials of the present invention in the test cell described, the modulation tends to increase substantially as the fluidity decreases. This indicates that the particle surfaces have an intrinsically high modulation efficiency but that some of this modulation is lost due to slippage of the particles past one another as they are subjected to varying pressure by the diaphragm. This slippage is dependent upon the shearing action created by the shape of the chamber in which the particles are contained and varies with variations in the microphone structure.

By reducing the fluidity of the particles, the slippage is reduced and, since the inherently high modulation efficiency of the surface (due to its microscopic smoothness and its sphericity at the points of contact) is not unduly altered, the modulation is increased. For certain microphone structures, optimum values of fluidity are found, with the modulation decreasing for both higher and lower fluidities. It is an advantage of the polymer carbon base materials of the present invention that their fluidities can be adjusted to optimum values very simply by the proper proportioning of spheres and agglomerates.

The manner in which spheres and agglomerates of polymer carbon can be produced is more particularly described and claimed in the copending applications of W. O. Baker and R. O. Grisdale Serial No. 223,633, W. O. Baker and F. H. Winslow Serial No. 223,638, and W. O. Baker, R. O. Grisdale and F. H. Winslow Serial No. 223,634, all filed on the same day as the present application.

As indicated above, polymer carbon bodies which consist substantially entirely of carbon, or of carbon containing a minor amount of an additional element, are formed by the pyrolytic dehydrogenation of similarly shaped bodies of hydrocarbon polymers or of polymers containing carbon, hydrogen and a minor amount of the additional element. The carbon or modified carbon which is produced is harder and less graphitic than any other carbon hitherto reported in the literature other than diamond.

Since the microphonic particles of the present invention which are the most readily produced are those which are spheres or agglomerated spheres formed substantially entirely of carbon and which are produced by the pyrolytic dehydrogenation of hydrocarbons, the production of this type of material will be described first.

Any solid hydrocarbon polymer body which can be converted in situ to a carbon body by pyrolysis will yield a product having the desirable microphonic properties referred to above. Any hydrocarbon polymer can be so converted if it has an adequate degree of cross-linking. A hydrocarbon polymer which has no substantial cross-linking, such as polystyrene, will be substantially completely converted to volatile products upon pyrolysis and will leave no carbon residue.

If the cross-linking in the polymer body is sufficiently great, as when the polymer is formed of trivinyl benzene, the body may be directly subjected to pyrolysis by heating in a nonoxidizing atmosphere and will yield a solid, coherent, essentially carbon body of the same shape which contains anywhere from 30 per cent to 60 per cent or more of the carbon originally present in the polymer.

More often, however, the polymer bodies will be of such a nature, as when formed of divinyl benzene polymers, that they are insufficiently cross-linked to give such a high yield of carbon upon pyrolysis. When such bodies are heated in a non-oxidizing atmosphere, they may leave no residue at all or, at best, they may leave carbon amounting to no more than about 10 per cent of the original weight of the polymer. If there is a carbon residue in such a case, the carbon may retain the original form of the polymer body but will then be a hollow shell. Thus hollow carbon spheres can be produced from polymer spheres of this type. Such hollow spheres will obviously have a much lower overall density than solid spheres of polymer carbon. These low density spheres may be of some value for microphonic purposes for certain microphone designs.

Spheres of a higher density are more often required since the most efficient transfer of mechanical energy from the diaphragm of the microphone to the mass of carbon particles is obtained when the density of the aggregate of the carbon particles is properly matched to the effective inertia of the diaphragm. Therefore, in order to secure a higher density, an increased yield of carbon is needed from these less highly cross-linked polymers. This increased yield can be obtained by heating the polymer bodies in air, prior to pyrolysis, to temperatures reaching a maximum at between 200° C. and 300° C. and preferably at about 250° C. Although it is possible to obtain a small but substantial increase in the yield of carbon by air-baking at the maximum temperature for as little as two hours, more substantial increases in yield are obtained if the baking is continued for at least four hours. For the greatest increase in carbon yield, the baking is continued for longer periods of, for instance, twenty-four hours or one week or even two weeks. Preferably the polymer bodies are brought gradually from room temperature to the maximum temperature while in contact with air.

By this air-baking procedure, solid carbon bodies in yields of 50 per cent or more of the weight of the polymer can be obtained upon pyrolysis with polymers which, when subjected to pyrolysis without prior air-baking, would give hollow bodies with carbon yields of only 6 or 7 per cent. The air-baking can also be used to increase the carbon yields of highly cross-linked polymers, such as polymers of trivinyl benzene, although the proportional increase in yield is less for those polymers which give a high yield without prior air-baking. A similar increase in yield of carbon can be obtained by a preliminary baking in certain atmospheres other than air, such as ammonia, nitric oxide, hydrogen sulfide, sulfur dioxide or methylamine.

It is apparent from the discussion above that the apparent density of polymer carbon particles (which is dependent upon the carbon yield of the polymer particles) can be controlled in two ways. First, the composition of the polymer can be chosen to give varying degrees of cross-linking. Second, in polymers having intermediate degrees of cross linking, the density can be controlled by varying the amount of preliminary air-baking.

As indicated above, even with preliminary air-baking, a certain minimum amount of cross-linking is required in the polymer in order to produce a carbon yield sufficient to result in a solid carbon body. The cross-linking of the polymer is sufficient if the polymer body, prior to air-baking, does not swell to more than five times its original volume in a thermodynamically inert solvent (having no substantial heat of solution) such as benzene or carbon tetrachloride. Preferably the cross-linking is such that the swelling under these conditions is less than 1.25 times the initial volume. The highest carbon yields are obtained when the swelling is negligible.

Polymers capable of achieving the requisite degree of cross-linking may be obtained by the polymerization of a hydrocarbon monomer or a mixture of polymerizable hydrocarbon monomers containing olefinic or acetylenic bonds and having an average active functionality sufficiently greater than 2 to permit the required cross-linking. In such monomers, each olefinic double bond contributes a functionality of 2 and each acetylenic triple bond contributes a functionality of 4. The average functionality of a monomer mixture is computed by multiplying the mol fraction of each monomer in the mixture by the functionality of that monomer and adding the products thus obtained.

Polymers formed from monomers having an average functionality of at least 2.4 can, with preliminary air-baking, be made to give high carbon yields upon pyrolysis. Polymers formed from polymerizable materials made up of at least 50 per cent by weight of one or more monomers having an average functionality of at least 6 can be made to give a high carbon yield upon pyrolysis without preliminary air-baking. The polymers formed from the monomers of the higher average functionality can achieve the higher degree of cross-linking and thus can produce polymers carbon bodies of higher overall density. The desired functionality can be achieved in any case either by the choice of individual monomers of the required functionality or by the proper proportioning of two or more monomers of different functionalities.

Examples of monomers from which suitable hydrocarbon polymers can be produced are divinyl benzene with a functionality of 4, trivinyl benzene with a functionality of 6, divinyl naphthalene with a functionality of 4, vinyl acetylene with a functionality of 6, divinyl acetylene with a functionality of 8, bis (p-vinyl phenyl) methane with a functionality of 4, or vinyl butadienyl acetylene with a functionality of 10. Similarly, naturally occurring unsaturated short-chain hydrocarbon polymers, such as lycopene or beta carotene ($C_{40}H_{56}$), which contain eleven conjugated double bonds in their molecules, may be subjected to further polymerization to produce highly cross-linked materials for conversion to polymer carbon.

Mixtures of these polymerizable materials with one another or with bifunctional hydrocarbon monomers may be copolymerized so as to produce a polymer of the desired functionality.

Polymerization of the monomers or monomer mixtures can be accomplished in the conventional manner with either the original monomers or the partially polymerized material, while still plastic, being formed in the desired shape. Thus polymerization is conveniently accomplished by adding 1 per cent by weight of benzoyl peroxide to the material to be polymerized and then heating it to a temperature at which polymerization occurs at a practical rate, as for instance at temperatures between 60° C. and 150° C. Polymerization is ordinarily continued until a polymer is produced which, as stated above, does not swell to more than five times its original volume in a solvent having no substantial heat of solution.

As is known in the art, polymerization may be accomplished with larger or smaller amounts of benzoyl peroxide as, for instance, between 0.5 per cent and 4 per cent. Other polymerization catalysts such as cumene hydroperoxide, t-butyl hydroperoxide, 1-hydroxy cyclohexyl hydroperoxide-1, lauryl peroxide, stearyl peroxide or other acyl peroxides can be used in amounts comparable to those used for benzoyl peroxide. Promoters such as cobalt naphthenate, iron naphthenate, dimethyl aniline, ethyl mercaptan, butyl mercaptan, dodecyl mercaptan, or azo bis-butyronitrile may be used with the polymerization catalyst, if desired, in any suitable amount as, for instance, between .05 per cent and 0.2 per cent by weight of the polymerizable material.

Where polymer carbon spheres are to be produced, the polymers formed predominantly from monomers made up of aromatic nuclei having unsaturated aliphatic hydrocarbon substituents thereon are particularly desirable since they lend themselves to suspension polymerization by which essentially perfect spheres of small, controllable size can be produced in high yield. The polyvinyl aromatic compounds, particularly divinyl benzene and trivinyl benzene, alone or in mixture with other polymerizable monomers and particularly in mixtures in which the only other polymerizable materials are other vinyl benzenes such as styrene or ethyl vinyl benzene, are particularly suited to polymerization by this process. A commercially available mixture which is particularly suitable contains five parts by weight of divinyl benzene and four parts by weight of ethyl vinyl benzene.

In the formation of polymer spheres by this method the material to be polymerized is agitated, as by rapid stirring, together with a body of a non-solvent suspension liquid, such as water. Under the influence of the continuing agitation, the material to be polymerized breaks up into spherical globules dispersed in the suspension liquid. The entire system is maintained at a polymerizing temperature until rigid, non-tacky polymer spheres are produced. The polymerization in suspension can be continued until the requisite degree of cross-linking, as set forth above, has been achieved or the polymer spheres can be removed from the suspension after they have become rigid and non-tacky and can be subsequently heated to complete their polymerization.

The manner in which a partial yield of polymer spheres of mixed sizes can be produced by this method is known to the art. A procedure by which high yields of spheres falling within a narrow size range can be produced is described and claimed in the copending application of F. H. Winslow, Serial No. 182,309, filed August 30, 1950.

According to this procedure, a liquid mass of material to be polymerized, which contains a polymerization catalyst, is rapidly stirred by a rotary stirrer into suspension in at least five times as much by volume, and preferably ten to fifteen times as much by volume, or water or an aqueous solution of an inorganic salt, the pH of which is maintained at a value between 3 and 7 and which has dissolved in it between 0.25 per cent and 5 per cent, and preferably about 2 per cent, of a suspension stabilizing agent comprising polyvinyl alcohol having a degree of hydrolysis of at least 95 per cent and preferably at least 98 per cent and having an intrinsic viscosity in aqueous solution of between 0.3 and 0.9. The temperature of the system is maintained between about 60° C. and 100° C., and preferably between about 75° C. and 85° C., until the suspended spheres have polymerized to a rigid, non-tacky state.

In this process, an increase in the rate of agitation and an increase in the concentration of the polyvinyl alcohol in the aqueous suspension medium tend to decrease the size of the spherical polymer particles which are produced. Similarly, the use of polyvinyl alcohols of decreasing degrees of hydrolysis or of increasing intrinsic viscosities tends to decrease the size of the spheres. With polyvinyl alcohols having degrees of hydrolysis and intrinsic viscosities falling within the range set forth above, a high yield of unagglomerated spheres, the greater proportion of which have a diameter falling within a narrow range of size distribution, can be obtained with average diameters lying between .05 millimeter and 1.5 millimeters. Larger spheres can be obtained in lower yield by decreased agitation and lower concentrations of polyvinyl alcohol, particularly when the lower viscosity grades of polyvinyl alcohol are used. When it is desired to produce spheres of smaller diameter, down to .005 millimeter for instance, a polyvinyl alcohol of lower degree of hydrolysis, for instance about 77 per cent, and a higher intrinsic viscosity, for instance about 1.0, may be used.

The fraction of polymerized material which is removed from suspension as agglomerated spheres, instead of individual spheres, can be converted to polymer carbon and used for forming microphone granules of reduced fluidity as described above. The conversion of the agglomerated spheres to polymer carbon can be accomplished while they are still mixed with the polymer spheres or they can be separated, as on a vibrating table separator, prior to conversion.

The pyrolytic dehydrogenation of the spheres or agglomerated spheres to form the polymer carbon granules is carried out, with or without the preliminary baking in air, by heating in a non-oxidizing atmosphere to prevent loss of carbon by oxidation and to preserve the intrinsically high modulation efficiency of the surfaces. Nitrogen and helium are desirable atmospheres to be maintained during pyrolysis, particularly during the latter stages. It is essential that the atmosphere be maintained as free as possible from traces of oxygen and water vapor since these substances strongly affect the microphonic properties of the resulting carbon, particularly during the final phase of pyrolysis at temperatures from about 950° C. to 1200° C. Where the gas to be used contains these substances they can be conveniently removed by adding a small amount (of the order of 10 per cent) of hydrogen and passing the mixture of gases first over a palladium catalyst to convert the oxygen to water vapor and then through a drying tower filled with granular calcium hydride.

It has been found that the effect of the presence of oxygen or water vapor is to cause the formation of a thin surface layer of increased conductivity on the surface of the carbon particles. This layer of increased conductivity increases the effective area of electrical contact between adjacent particles and thus reduces the resistance of the mass of the particles although the overall resistivity of each particle has not been substantially changed. Since the effective area of electrical contact is increased for a given area of mechanical contact, the change of contact resistance with increased area of mechanical contact is reduced and the modulation is correspondingly reduced.

Much the same type of surface change appears to take place, at a considerably slower rate, when the polymer carbon granules are aged in contact with air at room temperature. As indicated above, this decrease in modulation efficiency upon aging can be avoided by sealing the granules in an inert gas.

The pressure of the gas in the pyrolytic furnace is preferably maintained slightly above atmospheric to prevent seepage of air into the furnace. Any conventional type of controlled atmosphere furnace may be used. The non-oxidizing gas is continuously passed through the furnace in order to sweep away the gaseous products of pyrolysis. Preferably the particles are not tumbled during pyrolysis so as to avoid as far as possible any contact of the particle surfaces with contaminating gases.

The polymer bodies in the pyrolytic furnace are brought gradually to the maximum temperature of pyrolysis so as to allow the gradual release of the gases which are developed and thus prevent destruction of the bodies. It has been found that a temperature rise of about 200° C. per hour between about 300° C. and the maximum temperature yields desirable results. Obviously the bodies may be heated more slowly if desired, as for instance at an average rate of about 5° C. per hour. A more rapid rate of heating, up to about 500° C. per hour, may also be used. The temperature increase is preferably made continuous.

The residual amount of hydrogen remaining in the final carbon product is dependent upon the maximum temperature to which the bodies are brought during pyrolysis for a substantial period of time. A product consisting of at least 99 per cent carbon can be produced by carrying the pyrolytic temperature to 850° C. and maintaining the material at this temperature for one-half hour or more.

In a typical product subjected to pyrolysis at a temperature increasing at the rate of 200° C. per hour until a temperature of 900° C. was reached and maintained at that temperature for one-half-hour, the hydrogen content was found to be 0.64 per cent by weight. After being maintained at 1000° C. for one hour, the hydrogen content was reduced to 0.36 per cent. The hydrogen content was reduced further to 0.23 per cent by heating one hour at 1100° C., to 0.12 per cent by heating one hour at 1200° C. and to between 0.02 per cent and 0.01 per cent by heating one to three hours at 1300° C. These values represent a hydrogen content of one hydrogen atom per twenty-three carbon atoms in the product heated to 1000° C. and one hydrogen atom per four hundred to eight hundred carbon atoms in the product heated to 1300° C.

The electrical resistivity of the product at 25° C. varies between about $10^5$ ohm-centimeters for a hydrogen content of about 1 per cent and about $10^{-2}$ ohm-centimeters (about three hundred times the resistance of graphite) for a hydrogen content not exceeding about .02 per cent.

When the resulting polymer carbon granules are to be used in a microphone, such as is shown in Figs. 1 and 2, in which they are sealed in an inert gas, it is preferable that they be kept out of contact with air or other contaminating gases between the time pyrolysis is completed and the time they are sealed in the microphone. When the granules are to be sealed in helium, nitrogen, or other protective gas, it is desirable that the last portion of the pyrolysis, or at least the cooling of the granules from the maximum pyrolytic temperature, be carried out in helium or other protective gas and that the granules be maintained in an atmosphere of helium or other protective gas until they are sealed in the microphone.

If the granules become exposed to air, hydrogen or other deteriorative gas, they can be restored to almost their original characteristics by heating to 1000° C. under a high vacuum or in an atmosphere of the protective gas until the bulk of the adsorbed deteriorative gas has been removed.

When it is desired to form granules in which polymer carbon formed as described above is coated with pyrolytic carbon, as shown in Fig. 5, this coating can be applied by any of the well-known procedures for depositing such a coating from a hydrocarbon gas, such as the procedure described above in connection with the preparation of the coated granules tested to give the data shown in Fig. 3.

As stated above, the valuable modulation properties of polymer carbon surfaces can be obtained, without the benefits of controllable density and fluidity, by forming a granule structure as shown in Fig. 6 in which a coating of polymer carbon is formed on a granular base of any refractory material, such as quartz.

This carbon coating can be formed by first forming a coating, on the base, of any of the polymers referred to above and then subjecting the coating to pyrolysis with or without preliminary air-baking, under the same conditions as set forth above. The same precautions as described above are necessary to preserve the stability of the polymer carbon surface against aging.

The polymer films to be converted to carbon films can be deposited in any convenient manner. Thus any of the liquid monomers or monomer mixtures, containing a polymerization catalyst, can be coated on the surface and then maintained at a polymerizing temperature until a polymer of the required degree of cross-linking has been produced. Similarly, the monomer or a partially polymerized material which is still soluble may be dissolved in a volatile solvent, the solution may be coated on the surface, the solvent may be allowed to evaporate and then the monomer or partially polymerized material may be further polymerized.

As indicated above, even when the polymer carbon surface on a refractory base is coated with pyrolytic carbon to produce a granule as shown in Fig. 7, the modulation of a mass of the granules is still superior to that of a mass of granules of similar refractory material having a single layer of pyrolytic carbon of good microphonic properties coated directly on its surface without the intermediate polymer carbon.

The hydrocarbon polymers from which the polymer carbon is made have been described above as formed from hydrocarbon monomers. The hydrocarbon polymers can also be formed from linear or network polymers which contain only carbon atoms in the linear chains or networks themselves but which also contain substituent atoms or radicals containing elements other than carbon and hydrogen, such as oxygen, nitrogen, sulfur or halogens, and which upon heating are converted to cross-linked hydrocarbon polymers. Thus, polyvinyl alcohol, which is an essentially linear polymer, evolves its oxygen in the form of water when heated to a temperature of 250° C. in a non-oxidizing atmosphere. The unsaturation introduced by the splitting off of the substituents results in extensive cross-linking so that, by the time substantially all of the oxygen has been driven off, as for instance after about fifteen hours at 250° C., a hydrocarbon polymer possessing adequate cross-linking for use in the process of the present invention has been produced. Similarly, polyvinylidene chloride and polyvinyl chloride, both essentially linear polymers, evolve HCl when heated in inert or non-oxidizing atmospheres or in the presence of dehalogenating agents and yield cross-linked hydrocarbon polymers suitable for the purposes of the present invention.

Examples of other cross-linked polymers which contain elements other than carbon and hydrogen and which are converted to cross-linked hydrocarbon polymers upon heating in a non-oxidizing atmosphere are the polymers of vinyl acrylic acid, chlorovinyl acrylic acid, propenyl ethinyl carbinol, propenyl ethinyl ketone, vinyl ethinyl ketone, hex-3en-5yn-2ol and hex-3en-5yn-2one.

Certain of the polymers described above which are convertible to cross-linked hydrocarbon polymers upon heating contain oxygen in side chains or groups. These polymers are to be distinguished from those cross-linked polymers which contain oxygen linkages in the actual network of the polymer itself, such as regenerated cellulose, phenolic resins or polyester resins. The oxygen in the network appears to have a graphitizing influence since the carbon produced from polymers containing such oxygen is a different form of carbon which is substantially more graphitic and is softer.

The desirable properties of polymer carbon for microphonic purposes are retained and are sometimes enhanced even when a minor proportion of the carbon, 20 per cent or less, is replaced with another uniformly distributed normally solid element. The introduction of these additional elements provides an additional advantage since they permit the electrical resistivity of the product to be controlled over a wider range than is possible with unmodified carbon. This additional element can be introduced into the polymer carbon by forming the carbon from a modified hydrocarbon polymer containing the additional element, in the required proportion to the carbon, in either the network of the polymer or in side groups or chains. As examples of elements which may be introduced in this manner may be mentioned silicon, boron, phosphorus, silver, titanium, aluminum, germanium, bismuth, tin, or other metals or metalloids. By the incorporation of varying amounts of the additional element, the resistance of the resulting polymer carbon bodies can be adjusted to the most desirable values for any particular microphone use.

As an example of the manner in which a polymer carbon containing silicon can be formed from a polymer containing silicon in the network structure, such a polymer can be formed by the polymerization of a polyallyl silane such as tetraallyl silane, methyl triallyl silane or dimethyl diallyl silane either alone or together with another polymerizable monomer such as divinyl benzene or trivinyl benzene. The desired silicon to carbon ratio can be obtained by the proper proportioning of silicon-containing and hydrocarbon monomers or of two or more monomers containing different silicon to carbon ratios.

Polymers containing silicon in side groups can be formed by the copolymerization of silyl styrenes, such as trimethyl silyl styrene, triethyl silyl styrene or other trialkyl silyl styrenes with a sufficient proportion of a polymerizable material of higher functionality to give the required degree of cross-linking, such as 20 per cent or more by weight of divinyl benzene, trivinyl benzene, tetraalkyl silane or methyl triallyl silane.

The trialkyl silyl styrenes can be prepared by the reaction of nuclear trialkylsilyl phenyl magnesium halides with acetaldehyde to yield trialkyl silylated phenyl α-methyl carbinols which are subsequently catalytically dehydrated over activated alumina at a temperature of about 300° C. to form the trialkyl silyl styrenes, as described more fully in the copending application of F. H. Winslow, Serial No. 223,640, filed on the same day as the present application, now Patent No. 2,642,415.

The presence of silicon in the polymer carbon results in an increase of electrical resistivity without any loss of modulation. Thus, a polymer carbon formed by dehydrogenating, at 960° C., a polymer of a mixture of five parts by weight of divinyl benzene and four parts by weight of ethyl vinyl benzene had an electrical resistivity of $1.5 \times 10^{-2}$ ohm-centimeters. When 10 per cent by weight of the monomer mixture of which the polymer was formed was replaced with trimethyl silyl styrene, the product of dehydrogenation at 960° C. had a silicon content of 1.2 per cent and had an electrical resistivity of $1 \times 10^{-1}$ ohm-centimeters. Larger amounts of silicon give progressively higher resistivities.

The polymers containing normally solid elements other than carbon can be converted to modified polymer carbon by the same pyrolytic procedures as described above for the hydrocarbon polymers.

The invention has been described in terms of its specific embodiments and, since certain modifications and equivalents will be apparent to those skilled in the art, this description is intended to be illustrative of but not necessarily to constitute a limitation upon the scope of the invention.

What is claimed is:

1. A carbon granule microphone having a modulation chamber containing a microphonic material consisting of hard, lustrous, coherent carbon particles, having substantial areas of smooth, spherical surface produced by the thermal dehydrogenation of similarly shaped bodies of a cross-linked hydrocarbon polymer.

2. A microphone as described in claim 1 wherein the carbon particles are discrete spheres.

3. A microphone as described in claim 1 wherein the carbon particles are made up of a mixture of discrete spheres and agglomerated spheres.

4. A microphone as described in claim 1 wherein the carbon particles are agglomerated spheres.

5. A microphone as described in claim 1 wherein the hydrocarbon polymer is a polymer of divinyl benzene.

6. A microphone as described in claim 1 wherein the hydrocarbon polymer is a copolymer of divinyl benzene and ethyl vinyl benzene.

7. A microphone as described in claim 1 wherein the hydrocarbon polymer is trivinyl benzene.

8. A microphone as described in claim 1 wherein the modulation chamber is hermetically sealed and the free space therein is filled with an inert gas.

9. A microphone as described in claim 1 wherein the modulation chamber is hermetically sealed and the free space therein is filled with helium.

10. A carbon granule microphone having a modulation chamber containing particles of hard, lustrous carbon formed by the thermal dehydrogenation of cross-linked hydrocarbon polymer particles and having outer coatings of carbon deposited pyrolytically from a hydrocarbon in the gaseous state.

11. A carbon granule microphone having a modulation chamber containing particles the surfaces of which are made up of hard, lustrous carbon formed by the thermal dehydrogenation of a cross-linked hydrocarbon polymer.

12. A carbon granule microphone having a modulation chamber containing a microphonic material consisting of hard, lustrous, coherent particles consisting of carbon containing not more than 20 per cent of another normally solid element, said particles being ones formed by the thermal dehydrogenation of similarly shaped particles of a cross-linked polymer formed of carbon, hydrogen and said additional element.

13. A carbon granule microphone as defined in claim 12 wherein said additional element is silicon.

14. A carbon granule microphone as defined in claim 12 wherein said additional element is boron.

References Cited in the file of this patent

UNITED STATES PATENTS

| Number | Name | Date |
|---|---|---|
| 524,172 | Jacques | Aug. 7, 1894 |
| 524,173 | Jacques | Aug. 7, 1894 |
| 935,897 | Egner et al. | Oct. 5, 1909 |
| 1,110,848 | Weintraub | Sept. 15, 1914 |
| 1,156,509 | Weintraub et al. | Oct. 12, 1915 |
| 1,498,597 | Weintraub | June 24, 1924 |
| 1,828,009 | Westhafer | Oct. 20, 1931 |
| 1,854,474 | Lane | Apr. 19, 1932 |
| 2,087,724 | Sanders | July 20, 1937 |
| 2,134,950 | Offutt | Nov. 1, 1938 |
| 2,282,235 | Moberly | May 5, 1942 |
| 2,502,183 | Swallen | Mar. 28, 1950 |